US012188258B1

(12) United States Patent
Farag

(10) Patent No.: US 12,188,258 B1
(45) **Date of Patent: *Jan. 7, 2025**

(54) REKEYABLE LOCK WITH SMALL INCREMENTS

(71) Applicant: ASSA ABLOY Americas Residential Inc., New Haven, CT (US)

(72) Inventor: Hanna Farag, Jurupa Valley, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/568,826

(22) Filed: Jan. 5, 2022

Related U.S. Application Data

(63) Continuation of application No. 16/527,215, filed on Jul. 31, 2019, now Pat. No. 11,220,840.

(60) Provisional application No. 62/712,903, filed on Jul. 31, 2018.

(51) Int. Cl.
*E05B 27/00* (2006.01)

(52) U.S. Cl.
CPC ........ *E05B 27/005* (2013.01); *E05B 27/0082* (2013.01)

(58) Field of Classification Search
CPC .... E05B 27/00; E05B 27/005; E05B 27/0082; E05B 27/0021; E05B 27/0053; E05B 29/004; E05B 29/0066; E05B 29/0046; E05B 27/0057; E05B 35/083; Y10S 70/23; Y10S 70/25; Y10T 70/7593; Y10T 70/7599; Y10T 70/7605; Y10T 70/761; Y10T 70/7616; Y10T 70/7621; Y10T 70/7644; Y10T 70/7729; Y10T 70/7734; Y10T 70/774; Y10T 70/7746; Y10T 70/7565; Y10T 70/7446; Y10T 70/7452; Y10T 70/7458; Y10T 70/7463; Y10T 70/7469; Y10T 70/7475; Y10T 70/748
USPC .......... 70/491–496, 368, 382–385, 357, 358, 70/337–343
See application file for complete search history.

(56) References Cited

U.S. PATENT DOCUMENTS

| | | | |
|---|---|---|---|
| 4,712,399 | A | 12/1987 | Mattossovich |
| 5,791,181 | A | 8/1998 | Sperber et al. |
| 5,819,566 | A | 10/1998 | Eden, Jr. |
| 6,860,131 | B2 | 3/2005 | Armstrong et al. |
| 6,862,909 | B2 | 3/2005 | Armstrong et al. |
| 6,871,520 | B2 | 3/2005 | Armstrong et al. |
| 6,951,123 | B2 | 10/2005 | Chong |

(Continued)

FOREIGN PATENT DOCUMENTS

| | | | |
|---|---|---|---|
| CN | 103114765 | A | 5/2013 |
| CN | 105196530 | A | 12/2015 |

(Continued)

OTHER PUBLICATIONS

International Search Report and Written Opinion for Application No. PCT/US2022/021338 mailed Jun. 23, 2022.

(Continued)

*Primary Examiner* — Suzanne L Barrett
(74) *Attorney, Agent, or Firm* — Merchant & Gould P.C.

(57) ABSTRACT

A rekeyable lock cylinder with a cylinder body and a plug assembly. The lock cylinder includes a plurality of key followers and a corresponding plurality of racks disposed in the plug assembly. Disengaging the racks from the key followers allows rekeying of the lock cylinder.

20 Claims, 10 Drawing Sheets

(56) References Cited

U.S. PATENT DOCUMENTS

| | | | |
|---|---|---|---|
| 6,959,569 B2 | 11/2005 | Strader et al. | |
| 6,973,813 B2 | 12/2005 | Erdely | |
| 7,007,528 B2 | 3/2006 | Chong et al. | |
| 7,114,357 B2 | 10/2006 | Armstrong et al. | |
| 7,117,701 B2 | 10/2006 | Armstrong et al. | |
| 7,213,429 B2 | 5/2007 | Armstrong et al. | |
| 7,234,331 B2 | 6/2007 | Armstrong et al. | |
| 7,308,811 B2 | 12/2007 | Armstrong et al. | |
| 7,322,219 B2 | 1/2008 | Armstrong et al. | |
| 7,434,431 B2 | 10/2008 | Armstrong et al. | |
| 7,448,239 B1 | 11/2008 | Huang et al. | |
| 7,448,240 B1 | 11/2008 | Huang et al. | |
| 7,565,825 B2 | 7/2009 | Wheatland et al. | |
| 7,634,931 B2 | 12/2009 | Segien et al. | |
| 7,836,739 B2 | 11/2010 | Huang et al. | |
| 7,878,036 B2 | 2/2011 | Armstrong et al. | |
| 7,900,491 B2 | 3/2011 | Chong | |
| 8,033,150 B2 | 10/2011 | Armstrong et al. | |
| 8,099,988 B1 | 1/2012 | Wheatland | |
| 8,291,735 B1 | 10/2012 | Damikolas | |
| 8,347,678 B2 | 1/2013 | Chong | |
| 8,408,080 B2 | 4/2013 | Damikolas | |
| 8,448,484 B2 | 5/2013 | Huang et al. | |
| 8,490,446 B2 | 7/2013 | Rao et al. | |
| 8,656,747 B2 | 2/2014 | Armstrong et al. | |
| 8,739,587 B2 | 6/2014 | Chen | |
| 8,881,567 B2 | 11/2014 | Chong et al. | |
| RE45,627 E | 7/2015 | Chong et al. | |
| 9,127,479 B2 | 9/2015 | Romero et al. | |
| 9,359,791 B2 | 6/2016 | Zhang | |
| 9,435,138 B2 | 9/2016 | Walls et al. | |
| 9,657,499 B2 | 5/2017 | Emory | |
| 9,988,828 B2 | 6/2018 | Emory | |
| 10,024,079 B2 | 7/2018 | Walls et al. | |
| 10,435,915 B2 | 10/2019 | Zhang | |
| 10,612,271 B2 | 4/2020 | Farag et al. | |
| 11,220,840 B1 * | 1/2022 | Farag | E05B 27/005 |
| 11,572,708 B2 * | 2/2023 | Farag | E05B 27/0082 |
| 2005/0016234 A1 | 1/2005 | Strader et al. | |
| 2006/0101880 A1 | 5/2006 | Ward-Dolkas et al. | |
| 2008/0314106 A1 | 12/2008 | Mathachan | |
| 2009/0277234 A1 | 11/2009 | Huang et al. | |
| 2009/0277239 A1 | 11/2009 | Mathachan | |
| 2010/0037666 A1 | 2/2010 | Chong | |
| 2011/0041577 A1 | 2/2011 | Zhang | |
| 2011/0041579 A1 | 2/2011 | Chen | |
| 2012/0247163 A1 | 10/2012 | Damikolas | |
| 2012/0304717 A1 | 12/2012 | Loreti | |
| 2013/0014548 A1 | 1/2013 | Fan et al. | |
| 2013/0086957 A1 | 4/2013 | Emory | |
| 2013/0086958 A1 | 4/2013 | Emory | |
| 2014/0041429 A1 | 2/2014 | Zhang | |
| 2014/0069156 A1 | 3/2014 | Romero et al. | |
| 2014/0223976 A1 | 8/2014 | Chiou et al. | |
| 2014/0250960 A1 | 9/2014 | Li et al. | |
| 2016/0369527 A1 | 12/2016 | Farag et al. | |
| 2020/0040605 A1 | 2/2020 | Farag | |
| 2022/0213716 A1 * | 7/2022 | Farag | E05B 27/005 |
| 2023/0102123 A1 * | 3/2023 | Farag | E05B 27/0082<br>70/384 |

FOREIGN PATENT DOCUMENTS

| | | |
|---|---|---|
| JP | 2011074613 A | 4/2011 |
| WO | 2022/204154 A1 | 9/2022 |

OTHER PUBLICATIONS

International Search Report for PCT/US2022/021338, mailed Jun. 23, 2022.

International Search Report and Written Opinion for Application No. PCT/US2019/044352 mailed Oct. 9, 2019.

U.S. Appl. No. 16/527,188, filed Jul. 31, 2019 entitled “Rekeyable Lock With Small Increments”.

U.S. Appl. No. 16/659,778, filed Oct. 22, 2019 entitled “Tool-Less Rekeyable Lock Cylinder”.

Chinese language and English language translation of CN Office Action, including search report, dated Oct. 26, 2021, for CN patent application No. 201980057198.8 (15 pages).

* cited by examiner

REKEYABLE LOCK WITH SMALL INCREMENTS

CROSS-REFERENCE TO RELATED APPLICATIONS

The present application is a continuation of U.S. patent application Ser. No. 16/527,215, filed Jul. 31, 2019, now U.S. Pat. No. 11,220,840; which claims priority from U.S. Provisional Patent Application No. 62/712,903, filed on Jul. 31, 2018, the disclosures of which are hereby incorporated by reference in their entireties.

BACKGROUND

Lock cylinders that can be rekeyed without removal of the cylinder plug are known. These types of locks are highly beneficial to consumers because the locks can be easily rekeyed without calling a locksmith. Sizes and tolerances of engaging components within the lock become smaller to allow an increased variation in the bitting of keys. This also creates an increase in stress on the small components. Therefore, there is a need for a rekeyable lock that increases the variation in the bitting of keys recognized by the lock while maximizing strength of the small components.

SUMMARY

This disclosure relates generally to locks; in particular, this disclosure relates to a lock with a rekeyable lock cylinder. According to one aspect of the present disclosure, a rekeyable lock cylinder is provided that maximizes a number of bitting positions for use in unlocking the lock cylinder. By maximizing a number of bitting positions, for example, seven or more bitting positions, the number of bitting combinations of a key used with the lock cylinder is increased. This maximizes security of the lock cylinder.

In one example of the present disclosure, a rekeyable lock cylinder is disclosed. The rekeyable lock cylinder includes a cylinder body and a plug assembly disposed in the cylinder body. The cylinder body has a longitudinal axis and is formed to define grooves. The plug assembly is rotatable about the longitudinal axis. The plug assembly includes a plug body, a first carrier subassembly disposed along a first side of the plug body, and a second carrier subassembly disposed along an opposing second side of the plug body. Each of the first carrier subassembly and the second carrier subassembly includes a locking bar, a key follower disposed in the plug assembly, and a rack disposed in the plug assembly. The locking bars are movable between a locked position engaged with one of the grooves of the cylinder body for blocking rotation of the plug assembly with respect to the cylinder body and an unlocked position spaced apart from one of the grooves of the cylinder body to allow rotation of the plug assembly with respect to the cylinder body. The racks control movement of the locking bars between the locked and unlocked positions. The racks are selectively disengageable from the key followers to facilitate rekeying between different keys. The key followers are formed to define two posts. Each rack is formed to include a slot extending through and bounded by the rack. The post is received in the slot such that complementary engagement surfaces of the post and slot engage with one another to block movement of the key follower relative to the rack.

In a further example of the present disclosure, a rekeyable lock cylinder includes a cylinder body with a longitudinal axis and formed to define grooves, and a plug assembly disposed in the cylinder body and being rotatable about the longitudinal axis relative to the cylinder body, the plug assembly including a plug body, a first carrier subassembly disposed along a first side of the plug body, and a second carrier subassembly disposed along an opposing second side of the plug body. The rekeyable lock cylinder further includes a key follower disposed in the plug assembly. Each of the first carrier subassembly and the second carrier subassembly includes a locking bar movable between a locked position engaged with one of the grooves of the cylinder body for blocking rotation of the plug assembly with respect to the cylinder body and an unlocked position spaced apart from one of the grooves of the cylinder body to allow rotation of the plug assembly with respect to the cylinder body, and a rack disposed in the plug assembly. The rack controls movement of the locking bar between the locked and unlocked positions and the rack is selectively disengageable from the key follower to facilitate rekeying between different keys. The key follower is formed to define first and second posts, each rack is formed to include a slot extending through and bounded by the rack, and each of the first and second posts is received in a slot of a corresponding rack of the first carrier subassembly and the second carrier subassembly such that complementary engagement surfaces of the post and the slot engage with one another to block movement of the key follower relative to the rack.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
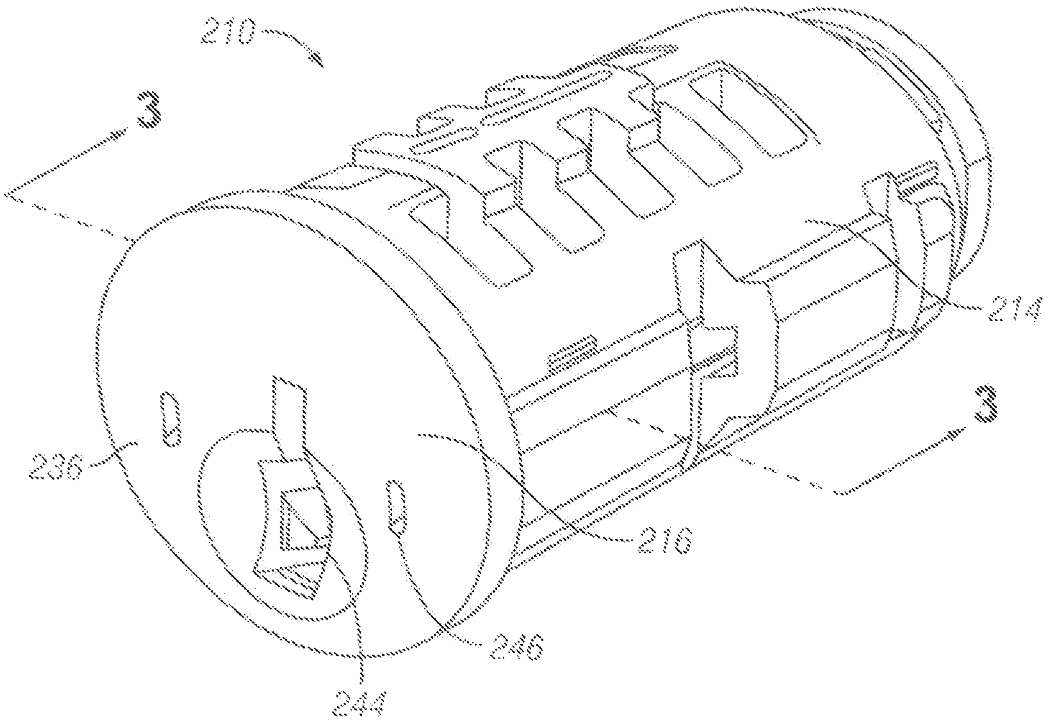
FIG. 1 is a perspective view of an example lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

This disclosure relates to a rekeyable lock cylinder that can be rekeyed without removal of the cylinder plug. The operation for rekeying the lock cylinder is similar to that described in co-pending U.S. Pat. Pub. No. 2016/0369527, which is hereby incorporated by reference. While the rekeying operation operates similarly, the present lock cylinder includes pin-rack engagement features that maximize a number of bitting positions in the lock while maintaining strength. This disclosure also relates to U.S. Provisional Patent Application No. 62/712,369 entitled "REKEYABLE LOCK WITH SMALL INCREMENTS", as well as U.S. patent application Ser. No. 16/527,188, filed on even date herewith, the disclosures of both of which are hereby incorporated by reference.

Figure 2:
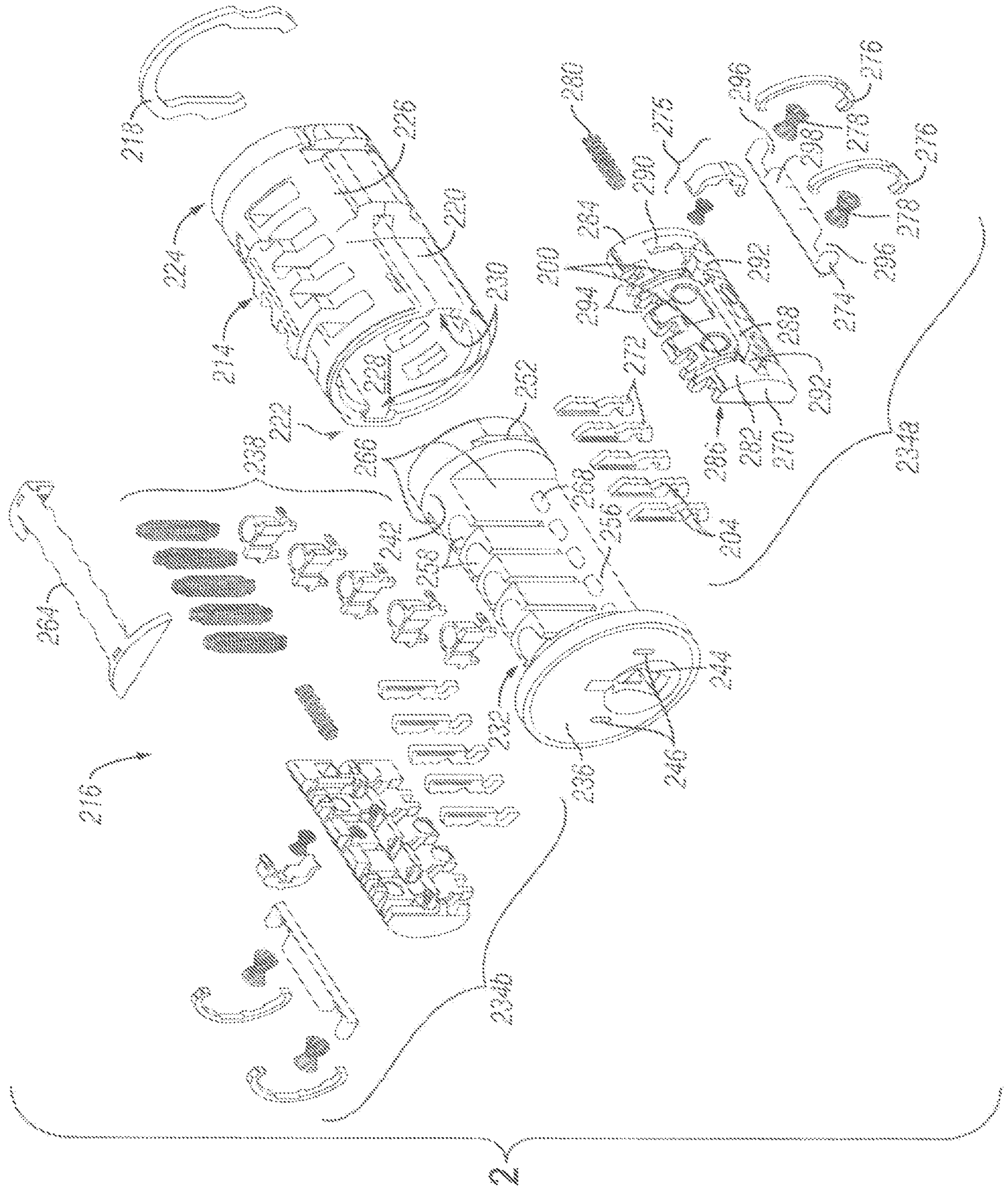
FIG. 2 is an exploded view of the example lock cylinder shown in FIG. 1.

An illustrative lock cylinder 210, according to an example of the present disclosure, is illustrated in FIGS. 1 and 2. The lock cylinder 210 includes a cylinder body 214 and a plug assembly 216. A retainer clip 218 (FIG. 2) couples together the cylinder body 214 with the plug assembly 216.

The cylinder body 214, as best seen in FIG. 2, illustratively includes a generally cylindrical body 220 having a front end 222, a back end 224, and a cylinder wall 226 defining an interior surface 228. The cylinder wall 226 includes an interior, locking bar engaging groove 230. In some embodiments, the locking bar engaging groove 230 has a generally rectangular-shaped cross-section and extends longitudinally along a portion of the cylinder body 214, typically from the front end 222.

The plug assembly 216 includes a plug body 232, a plurality of spring-loaded pins 238 (also called key followers), and carrier subassemblies 234*a*, 234*b* positioned on opposing sides of the plug body 232. The plug body 232 illustratively includes a plug face 236, an intermediate portion 240, and a drive portion 242. The plug face 236 defines a keyway opening 244 and rekeying tool openings 246. In some examples, the plug face 236 further defines a pair of channels extending radially outwardly for receiving anti-drilling ball bearings. The drive portion 242 is configured to drive a torque blade (not shown in FIG. 2), which could be coupled with a latch assembly (not shown). The drive portion 242 further includes a pair of slots 252 formed in its perimeter for receiving the retainer clip 218 to retain the plug body 232 in the cylinder body 214.

The intermediate portion 240 includes a main portion 256 having a plurality of channels 258 for receiving the spring-loaded pins 238. The channels 258 illustratively extend transversely to the longitudinal axis of the plug body 232. A retaining cap 264 is coupled to the plug body 232 to trap spring-loaded pins 238 inside the plug body 232. The channels 258 extend partially through the plug body 232, with the sidewalls of the channels open to opposing planar surfaces 266. The planar surfaces 266 illustratively include a plurality of bullet-shaped, rack-engaging features 268 that block rekeying of the lock cylinder 210 if racks 272 are not aligned to unlock the lock cylinder 210 (e.g., if a valid key is not inserted into the lock cylinder 210).

The carrier subassemblies 234*a*, 234*b* each include a carrier 270, a plurality of racks 272, a spring catch 275, a locking bar 274, a pair of clips 276 for holding corresponding biasing members 278 against the locking bar 274 to urge the locking bar 274 against the racks 272, and a return spring 280. The carrier 270 includes a body 282 in the form of a cylinder section that is complementary to the main portion 256 of the plug body 232, such that the carriers 270 and the main portion 256 combine to form a cylinder that fits inside the cylinder body 214. The carrier 270 includes a curved surface 284 and a flat surface 286. The curved surface 284 includes a locking bar slot 288, a spring catch recess 290, and a pair of clip receiving recesses 200 for receiving the clips 276. The locking bar slot 288 illustratively includes a pair of biasing member-receiving bores 292 for receiving the biasing members 278. In the embodiment shown, the locking bar 274 includes a corresponding pair of recessed areas 296 for receiving the biasing members 278. The flat surface 286 of the carrier 270 includes a plurality of parallel rack-receiving slots 294 extending perpendicular to the longitudinal axis of the carrier 270.

Figure 6:
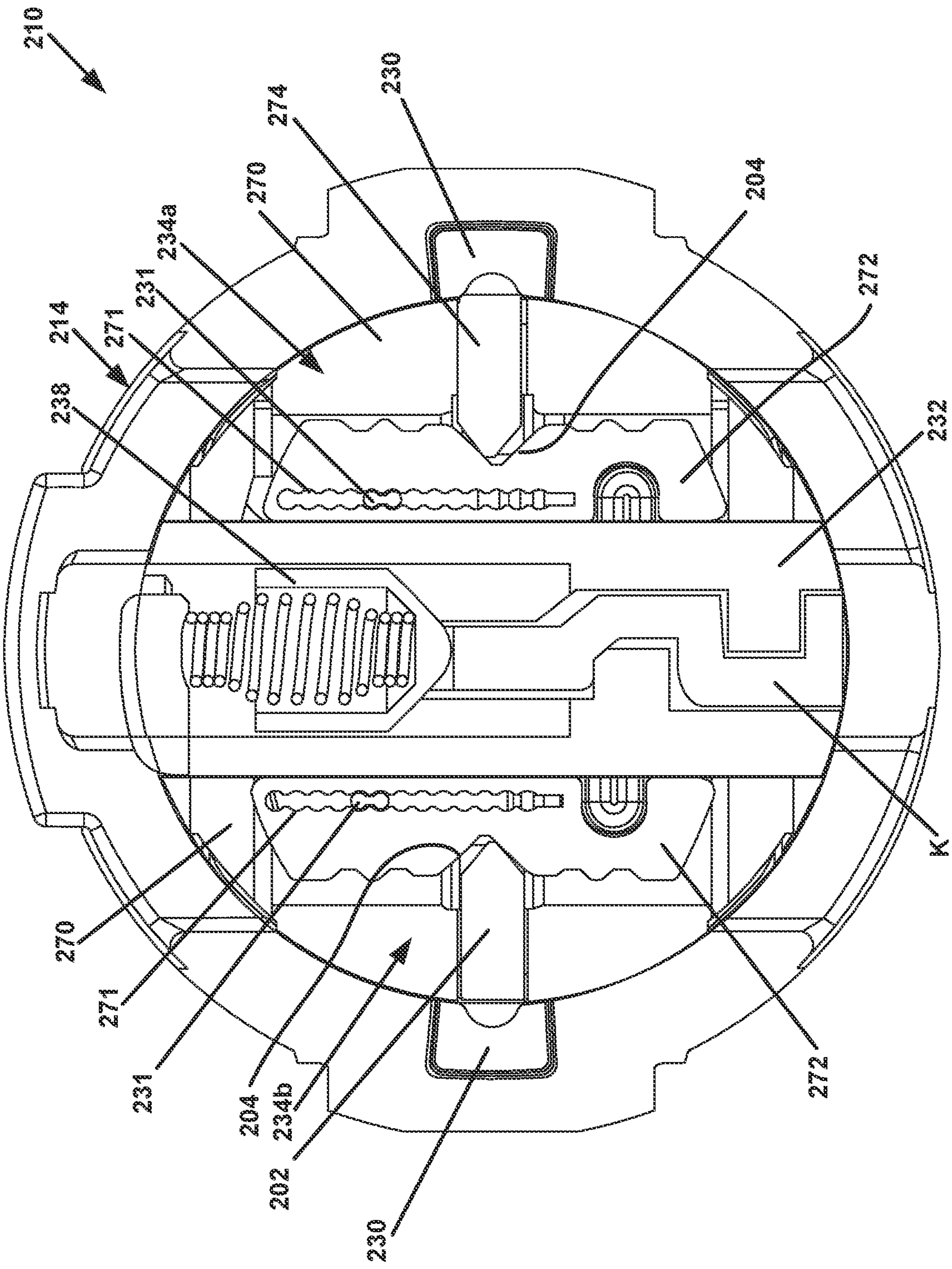
FIG. 6 is a cross-sectional view of the example lock cylinder shown in FIG. 1 showing the locking bars engaged with the racks in an unlocked position.
Figure 7:
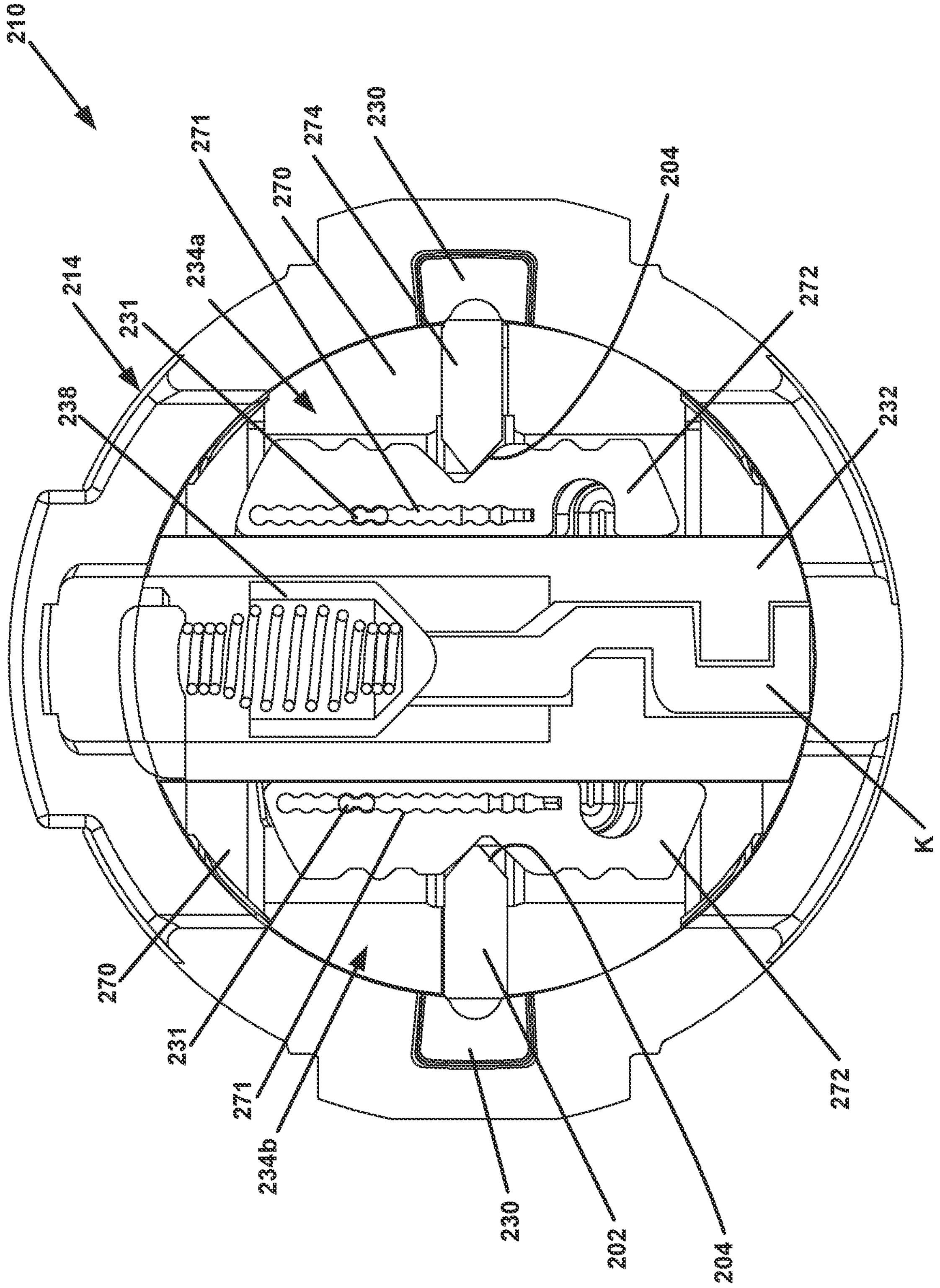
FIG. 7 is another cross-sectional view of the example lock cylinder shown in FIG. 1 showing the locking bars engaged with the racks in an unlocked position.

The spring-loaded locking bar 274 is sized and configured to fit in the locking bar slot 288 in the carrier 270. The locking bar 274 illustratively includes a blocking portion 298 that is received in the locking bar engaging groove 230 in the cylinder body 214 when in a locked position and extends out of the locking bar engaging groove 230 when in an unlocked position. Opposite the squared-off edge of the blocking portion 298, the locking bar 274 includes a flange 202 configured to engage locking bar engaging grooves 204 formed in the racks 272 (FIGS. 6 and 7). Biasing members 278 urge the blocking portion 298 out of the locking bar engaging groove 230 in the cylinder body 214 toward the racks 272. In the depicted examples, the flange 202 of each locking bar 272 is generally triangular shaped and sized so that, when the locking bars 274 are in the unlocked position, the flange 202 is positioned entirely within the locking bar engaging grooves 204 of the racks 272. As such, in the same examples, the locking bar engaging grooves 204 of the racks 272 are larger than the flange 202.

Figure 3:
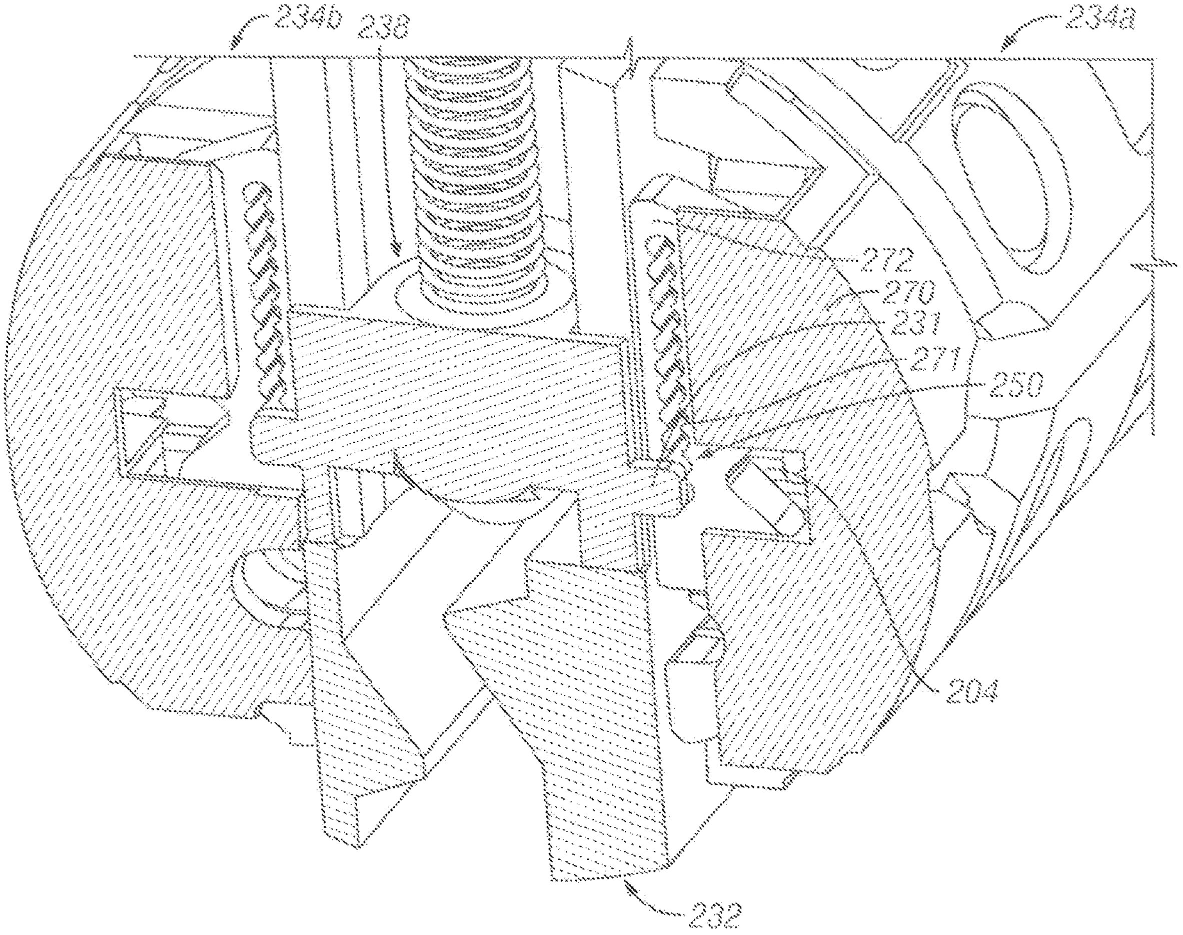
FIG. 3 is a perspective cross-sectional view along line 3-3 of FIG. 1 showing, among other things, the key followers engaged with the racks.
Figure 5:
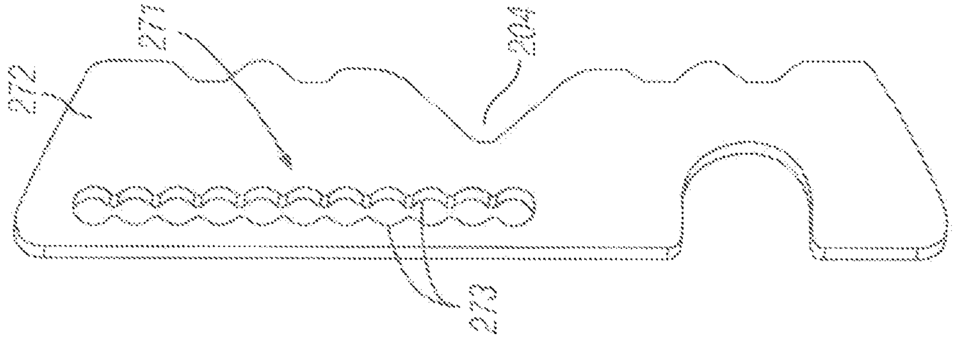
FIG. 5 is a perspective view of an example rack according to an embodiment of this disclosure associated with the example key follower shown in FIG. 4.
Figure 4:
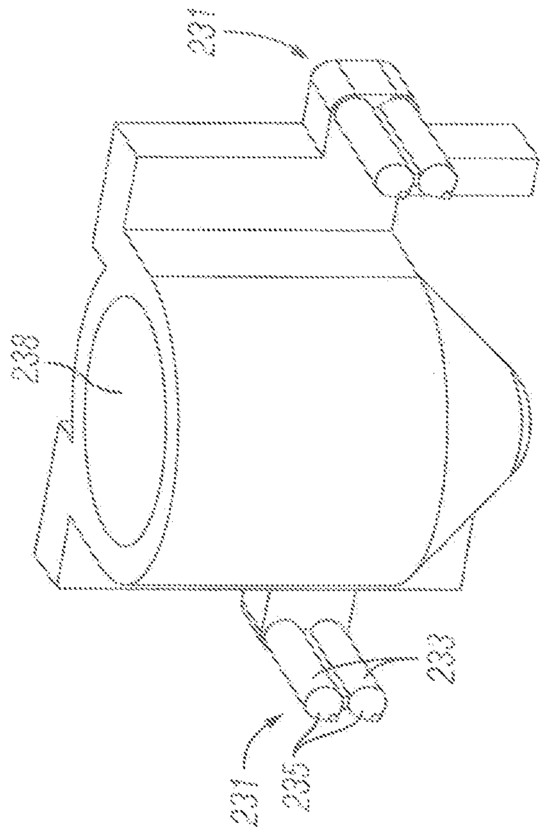
FIG. 4 is a perspective view of an example of a key follower according to an embodiment of this disclosure.

An example of a pin-rack engagement feature 250 according to an embodiment of the present disclosure is shown in FIGS. 3, 4, and 5. The pin-rack engagement feature 250 includes a post 231 of the spring-loaded pins 238 engaged with a mating slot 271 of the racks 272. Complementary engagement surfaces of post 231 and slot 271 engage with one another to block movement of spring-loaded pins 238 relative to racks 272. In some examples, the slot 271 provides engagement support around the post 231, specifically on opposing sides of the post 231.

Each spring-loaded pin 238 includes two posts to engage with opposing racks 272 of carrier subassemblies **234*a*, 234*b*. As shown in FIG. 4, each post 231 includes two offset barrels 233 arranged in a linear pattern. In some examples, each post 231 can have barrels 233 arranged is multiple linear patterns. For example, the linear patterns of the barrels 233 can be offset from one another by a half of a key cut increment to increase engagement with the rack 272. Each barrel 233 defines a semi-cylindrical outer surface. In some examples, the barrels are arrangement in a triangular pattern. In some embodiments, cones 235 are arranged at the ends of barrels 233 to guide insertion of post 231 into slot 271**.

Reducing size allows the lock to distinguish between additional bitting positions to increase the number of possible bitting sequences or patterns on keys used in lock cylinder 210 compared to the rekeyable lock cylinder described in co-pending U.S. Pat. Pub. No. 2016/0369527, which increases security. The term "bitting position" is intended to mean a depth of a key cut in a bitting sequence of a key. The "bitting position" is typically identified by a digit or letter that indicates a depth of a key cut. The number of bitting positions (i.e., depths of key cuts) that can be recognized by lock cylinders differ. For example, the lock cylinder described in co-pending U.S. Pat. Pub. No. 2016/0369527 is capable of recognizing six different bitting positions. This can be seen by the six gear teeth grooves in the racks illustratively shown in that application that receive the tooth of the key followers, which allows six positions of the key followers relative to the racks. The six positions of the racks relative to the key followers correspond with six bitting positions available for the lock cylinder illustratively described in that application. Due to tolerances in machining and structural rigidity of the racks, it is not feasible to increase the number of gear teeth in the racks to increase the number of bitting positions that are recognized by the lock cylinder described in that application.

The pin-rack engagement feature 250, illustratively described herein, increases the number of bitting positions recognized by the lock cylinder 210. In the depicted example, there are ten grooves 273 available in each rack 272 that can be engaged by the posts 231 of the key followers 238. Each consecutive groove 273 is spaced from one another by an increment distance which, in some examples, is equal to the incremental distance separating each consecutive bitting position on a key. Accordingly, there are ten bitting positions recognized by the lock cylinder 210 in the example shown. Of course, one skilled in the art should appreciate that the lock cylinder 210 is shown for illustrative purposes and could potentially include more or less grooves 273 in each rack 272 to adjust the number of bitting positions recognized by the lock cylinder 210.

By increasing the possible bitting positions available, such as seven or more for example, this increases the number of possible combinations for the bitting sequences to unlock the lock cylinder 210, thereby increasing security. The pin-rack engagement feature 250 is also robust due to each tooth becoming thinner and less stiff as size is reduced.

As seen in FIG. 5, mating slot 271 includes a series of semi-cylindrical grooves 273. A series of grooves 273 extends along either side of mating slot 271 and correspond to the pattern of barrels 233. The semi-cylindrical surfaces of the barrels 233 and semi-cylindrical grooves 273 maximize a contact surface area of the pin-rack engagement feature 250. In some embodiments, barrels 233 and grooves 273 are formed to define complimentary non-circular geometric profiles, such as triangular or rectangular for example. In the illustrative embodiment, slot 271 extends through and is bounded on all sides by rack 272 as shown in FIG. 5.

The semi-cylindrical surfaces of the barrels 233 and semi-cylindrical grooves 273 increase the contact surface area of the pin-rack engagement feature 250. When mated, a single barrel 233 can interface with a single semi-cylindrical surface of the groove 273. In some examples, when mated, a pair of barrels 233 interfaces with a pair single semi-cylindrical surfaces of the groove 273 to further strengthen and stabilize the pin-rack engagement feature 250. This maintains strength of the pin-rack engagement feature 250 even as sizes of the components are reduced. It is considered within the scope of the present disclosure that the key followers 238 can have a variety of different numbers of barrels 233 that interface with a variety of different numbers semi-cylindrical surfaces of the grooves 273. In some examples, depending on the thickness of the rack 272 and the lengths of the posts 231, the post 231 does not extend entirely through the slot 271. The post 231 only needs to interface, and interlock, with the slot 271 to ensure that the rack 272 and key followers 238 move together.

To rekey the lock cylinder 210, a valid key is inserted into the keyway opening 244 and rotated. A tool (not shown) is inserted into the tool opening 246 and pushed against the carrier 270 to move the carrier 270 parallel to the longitudinal axis of the lock cylinder 210 until the spring catch 275 moves into detent recesses of the cylinder body 214. Moving the carrier 270 withdraws the posts 231 of the spring-loaded pins 238 from the mating slots 271 of the racks 272 in a longitudinal direction, parallel with the longitudinal axis of the lock cylinder 210. The valid key is then removed and a second key is inserted and rotated to release the spring catch 275. As the spring catch 275 leaves the detent recesses of the cylinder body 214, the carrier 270 is biased toward the plug face 236 by the return spring 280, causing the posts 231 to insert into the mating slots 271 in a longitudinal direction, parallel with the longitudinal axis of the lock cylinder 210. At this point, the lock cylinder 210 is keyed to the second (valid) key and the first key no longer operates the lock cylinder 210.

As the number of bitting positions increases, the incremental position between each bitting position decreases or becomes smaller. A stack up of tolerances from the engagement of multiple components can cause variations in the position of the locking bar engaging grooves 204 formed in the racks 272 during operation of lock cylinder 210. As shown in FIGS. 6 and 7, the locking bar engaging grooves 204 of each rack 272 are wider than the flanges 202 of the locking bars 274. This allows a slight variation in a valid position of the locking bar engaging grooves 204 relative to the flange 202 to allow unlocking of the lock cylinder 210. In some embodiments, the variation can be a difference of one bitting position (e.g., a bitting position of 1 versus a bitting position of 2). The variation can also be biased such that only variation in one direction is allowed (e.g., if a rack is programmed for a bitting position of 2, a bitting position of 1 will still work, but a bitting position of 3 will not work). Thus, the locking bars 274 can have multiple positions within the locking bar engaging grooves 204 of the rack 272, including at least one valid position where the locking bars 274 are in the unlocked position. In some examples, the locking bars 274 can have multiple positions within the locking bar engaging grooves 204 of the rack 272, including at least two valid positions where the locking bars 274 are in the unlocked position. In some examples, the locking bars 272 have at least three positions (and sometimes four, depending on tolerance stack) within the locking bar engaging grooves 204 of the rack 272, where at least two positions are valid positions and the locking bars 274 are in the unlocked position. This can create a cross-keying problem. Cross keying occurs when a key with a key cut either above or below the valid key cut (for example, one cut depth deeper or shallower) operates the lock and permits locking bars 274 to move within the locking bar engaging grooves 204. The valid key cut is the key cut that the racks 272 are programed to.

To counteract this potential cross-keying issue, in the examples shown in FIGS. 6 and 7, racks 272 of each carrier subassembly 234*a*, 234*b* are oppositely biased. This blocks cross keying by allowing only one overall valid position (e.g., bitting position of 1) for a corresponding set of racks 272 of the carrier subassemblies 234*a*, 234*b* attached to a single spring-loaded pin 238 that will allow unlocking of lock cylinder 210. Because they are oppositely biased, the tolerance stacks work against one another (i.e., they are inverse) resulting in a single valid position. Said another way, one rack 272 will eliminate and counteract cross keying that the opposing rack 272 allows. As shown, even though the locking bars 274 are in different valid positions within the locking bar grooves 204, they are in opposite valid positions. In some examples, when an invalid key is presented to the lock cylinder 210, the locking bars 274 can both be positioned within the locking bar engaging grooves 204, but in opposite locked positions.

FIGS. 6 and 7 show an example use of the lock cylinder 210 when receiving a key K.

In FIG. 6, for illustration purposes only, the key K is cut to a #5 key cut depth. The rack 272 of the carrier subassembly 234*a* and the rack 272 of the carrier subassembly 234*b* are both shown programmed to a #5 key cut. This is evidenced in that, from the top side of either rack 272, the posts 231 of the key follower 238 are interfaced with the fifth groove 273 of each slot 271 of each rack 272.

The locking bar 274 is shown positioned in an unlocked position at the top side of the locking bar engaging groove 204 of rack 272 of the carrier subassembly 234*a*. If a key K with a key cut of a #6 depth was inserted, the locking bar 274 of the carrier subassembly 234*a* would still be positioned in an unlocked position, but at the bottom side of the locking bar engaging groove 204 of rack 272. However, if a key K with a key cut of a #4 depth is inserted, the locking bar 274 of the carrier subassembly 234*a* would be positioned in a locked position, causing the lock to remain locked. In some examples, the locking bar 274 may be in the locked position while still positioned within the locking bar engaging groove 204, but extended within the locking bar engaging groove 230 of the cylinder wall 226.

Conversely, the locking bar 274 is shown positioned in an unlocked position at the bottom side of the locking bar engaging groove 204 of rack 272 of the carrier subassembly 234*b*. If a key K with a key cut of a #4 depth is inserted, the locking bar 274 of the carrier subassembly 234*b* would still be positioned in an unlocked position, but at the top side of the locking bar engaging groove 204 of rack 272. However, if a key K with a key cut of a #6 depth is inserted, the locking bar 274 of the carrier subassembly 234*b* would be positioned in a locked position, causing the lock to remain locked. In some examples, the locking bar 274 may be in the locked position while still positioned within the locking bar engaging groove 204, but extended within the locking bar engaging groove 230 of the cylinder wall 226.

Therefore, if a key K with a key cut of one increment above or below the programed key cut (i.e., #5) were inserted, each carrier subassembly 234*a*, 234*b* operates in inverse of one another, thereby effectively reducing the cross keying opportunity.

In FIG. 7, for illustration purposes only, the key K is cut to a #5 key cut depth. The rack 272 of the carrier subassembly 234*a* is programmed to a #4 key cut depth and the rack 272 of the carrier subassembly 234*b* is programmed to a #6 key cut depth.

The locking bar 274 is shown positioned in an unlocked position at the bottom side of the locking bar engaging groove 204 of rack 272 of the carrier subassembly 234*a*. If a key K with a key cut of a #5 depth is inserted, the locking bar 274 of the carrier subassembly 234*a* would still be positioned in an unlocked position, but at the top side of the locking bar engaging groove 204 of rack 272. However, if a key K with a key cut of a #4 depth is inserted, the locking bar 274 of the carrier subassembly 234*a* would be positioned in a locked position, causing the lock to remain locked. In some examples, the locking bar 274 may be in the locked position while still positioned within the locking bar engaging groove 204 but extended within the locking bar engaging groove 230 of the cylinder wall 226.

Conversely, the locking bar 274 is shown positioned in an unlocked position at the top side of the locking bar engaging groove 204 of rack 272 of the carrier subassembly 234*b*. If a key K with a key cut of a #5 depth is inserted, the locking bar 274 of the carrier subassembly 234*b* would still be positioned in an unlocked position, but at the bottom side of the locking bar engaging groove 204 of rack 272. However, if a key K with a key cut of a #4 depth is inserted, the locking bar 274 of the carrier subassembly 234*b* would be positioned in a locked position, causing the lock to remain locked. In some examples, the locking bar 274 may be in the locked position while still positioned within the locking bar engaging groove 204, but extended within the locking bar engaging groove 230 of the cylinder wall 226.

Therefore, when the racks 272 are programed as shown, even while the racks are programmed to different key cuts, because of their inverse nature, only a key K with a key cut of a #5 key cut depth will operate the locking bar 274 of both carrier subassemblies 234*a*, 234*b* to move the locking bars 274 into the unlocked positions.

Figure 9:
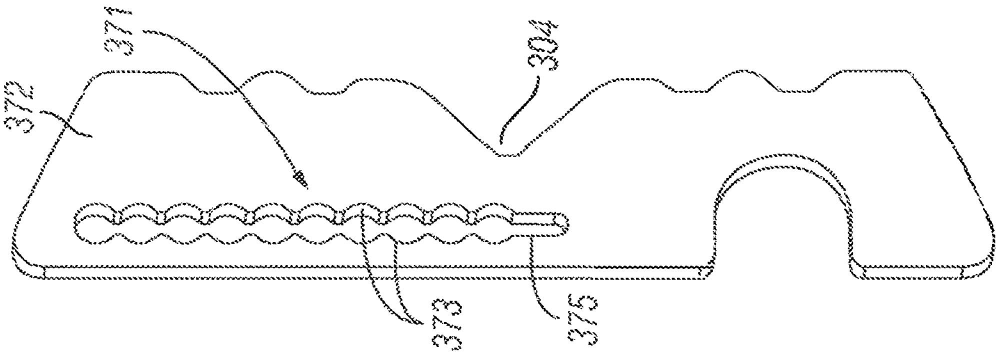
FIG. 9 is a perspective view of another example of a rack according to an embodiment of this disclosure associated with the key follower of FIG. 8.
Figure 8:
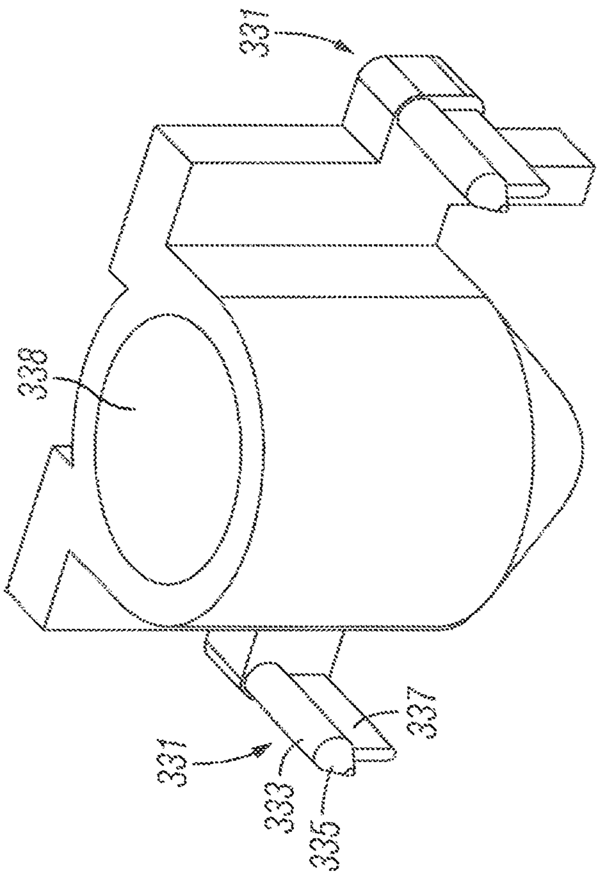
FIG. 8 is a perspective view of another example of a key follower according to an embodiment of this disclosure.

Another example of a pin-rack engagement feature according to an embodiment of the present disclosure is shown in FIGS. 8 and 9. The pin-rack engagement feature includes a post 331 of spring-loaded pins 338 engaged with a mating slot 371 of racks 372. Complementary engagement surfaces of the post 331 and the slot 371 engage with one another to block movement of the spring-loaded pins 338 relative to the racks 372. As shown in FIG. 8, each post 331 includes a barrel 333 and a stiffening rib 337. The barrel 333 defines a semi-cylindrical outer surface. In some examples, a cone 335 is arranged at the ends of the barrels 333 to guide insertion of post 331 into slot 371. As seen in FIG. 9, the mating slot 371 includes a series of semi-cylindrical grooves 373. A series of grooves 373 extends along either side of the mating slot 371. A recess 375 is positioned at one end of the slot 371 to accommodate the stiffening rib 337. The semi-cylindrical surfaces of the barrel 333 and semi-cylindrical grooves 373 maximize a contact surface area of the pin-rack engagement feature. In some examples, the barrels 333 and the grooves 373 are formed to define complimentary non-circular geometric profiles, such as triangular or rectangular for example. In the illustrative embodiment, the slot 371 extends through and is bounded on all sides by the rack 372 as shown in FIG. 9. In some examples, the slot 371 does not extend through the entire rack 372.

Figure 11:
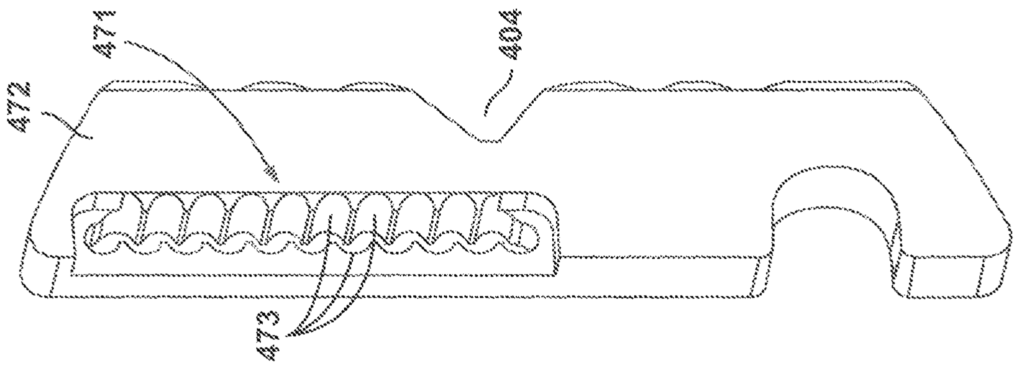
FIG. 11 is a perspective view of another example of a rack according to an embodiment of this disclosure associated with the key follower of FIG. 10.
Figure 10:
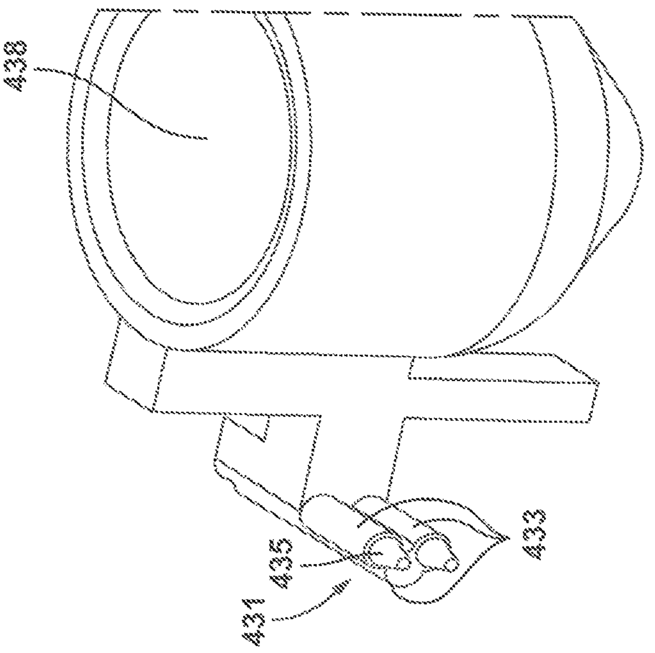
FIG. 10 is a perspective view of another example of a key follower according to an embodiment of this disclosure.

Another example of a pin-rack engagement feature according to an embodiment of the present disclosure is shown in FIGS. 10 and 11. The pin-rack engagement feature includes a post 431 of spring-loaded pins 438 engaged with a mating slot 471 of racks 472. Complementary engagement surfaces of the post 431 and the slot 471 engage with one another to block movement of the spring-loaded pins 438 relative to the racks 472. As shown in FIG. 10, each post 431 includes a pair of barrels 433. Each barrel 433 defines a semi-cylindrical outer surface. In some examples, a cone 435 is arranged at the end of each of the barrels 433 to guide insertion of posts 431 into slot 471. As seen in FIG. 11, the mating slot 471 includes a series of semi-cylindrical grooves 473. A series of grooves 473 extends along either side of the mating slot 471. The semi-cylindrical surfaces of each barrel 433 and semi-cylindrical groove 473 maximize a contact surface area of the pin-rack engagement feature. In some examples, the barrels 433 and the grooves 473 are formed to define complimentary non-circular geometric profiles, such as triangular or rectangular for example. In the illustrative embodiment, the slot 471 extends through and is bounded on all sides by the rack 472 as shown in FIG. 11. In some examples, the slot 471 does not extend through the entire rack 472. The slot 471 is generally positioned on an opposite side of the rack 472 from the respective locking bar engaging groove 404 of that rack.

Figure 12:
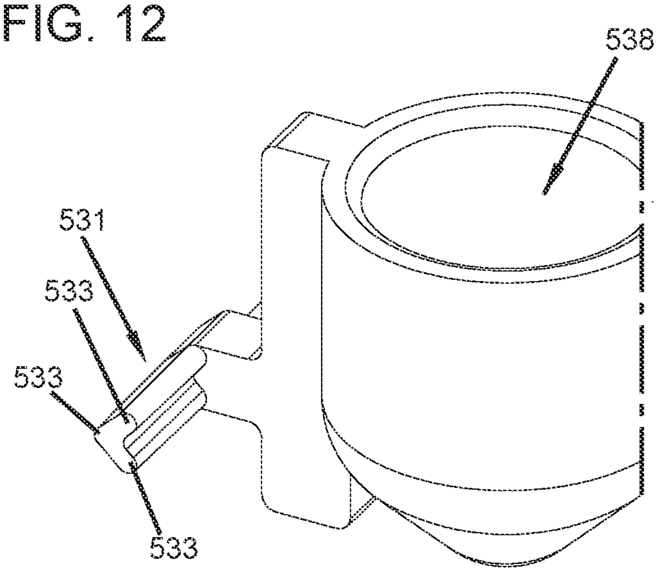
FIG. 12 is a perspective view of another example of a key follower according to an embodiment of this disclosure.
Figure 13:
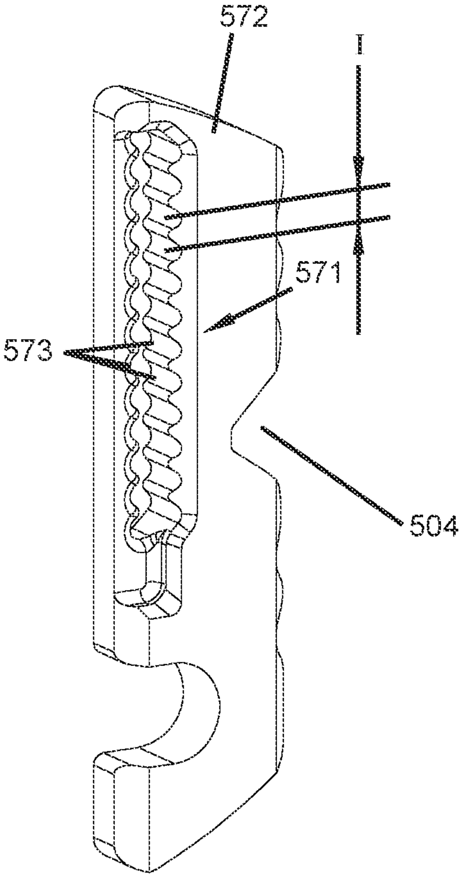
FIG. 13 is a perspective view of another example of a rack according to an embodiment of this disclosure associated with the key follower of FIG. 12.

Another example of a pin-rack engagement feature according to an embodiment of the present disclosure is shown in FIGS. 12 and 13. The pin-rack engagement feature includes a post 531 of spring-loaded pins 538 engaged with a mating slot 571 of racks 572. Complementary engagement surfaces of the post 531 and the slot 571 engage with one another to block movement of the spring-loaded pins 538 relative to the racks 572. As shown in FIG. 12, each post 531 includes three barrels 533. Each barrel 533 defines a semi-cylindrical outer surface. In some examples, a cone is arranged at the end of each barrel 533 to guide insertion of posts 531 into slot 571. As seen in FIG. 13, the mating slot 571 includes a series of semi-cylindrical grooves 573. A series of grooves 573 extends along either side of the mating slot 571. The semi-cylindrical surfaces of each barrel 533 and semi-cylindrical groove 573 maximize a contact surface area of the pin-rack engagement feature. In some examples, the barrels 533 and the grooves 573 are formed to define complimentary non-circular geometric profiles, such as triangular or rectangular for example. In the illustrative embodiment, the slot 571 extends through and is bounded on all sides by the rack 572 as shown in FIG. 13. In some examples, the slot 571 does not extend through the entire rack 572. The slot 571 is generally positioned on an opposite side of the rack 572 from the respective locking bar engaging groove 504 of that rack.

Figure 14:
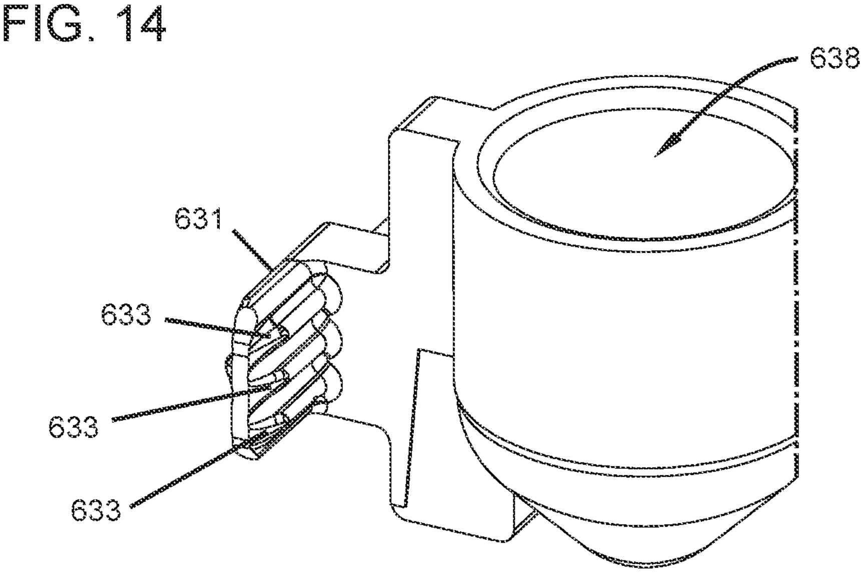
FIG. 14 is a perspective view of another example of a key follower according to an embodiment of this disclosure.
Figure 15:
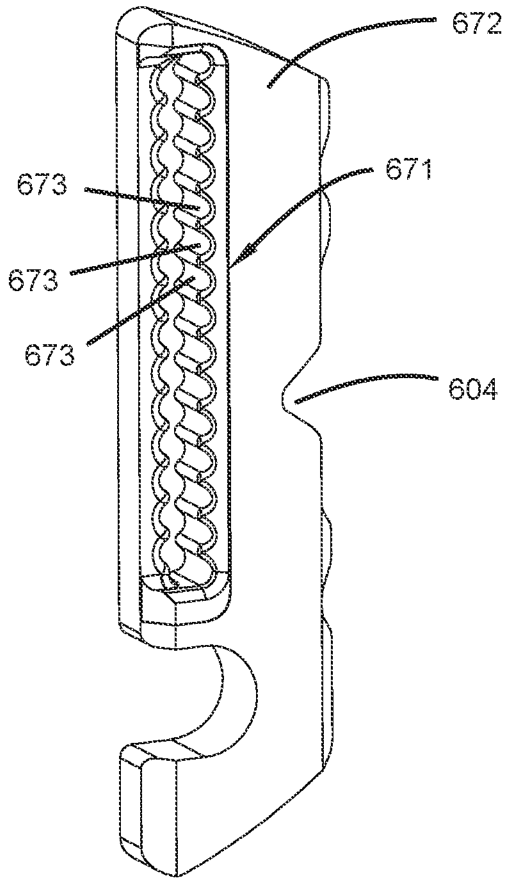
FIG. 15 is a perspective view of another example of a rack according to an embodiment of this disclosure associated with the key follower of FIG. 14.

A still further example of a pin-rack engagement feature according to an embodiment of the present disclosure is shown in FIGS. 14 and 15. The pin-rack engagement feature includes a post 631 of spring-loaded pins 638 engaged with a mating slot 671 of racks 672. Complementary engagement surfaces of the post 631 and the slot 671 engage with one another to block movement of the spring-loaded pins 638 relative to the racks 672. In some examples, the slot 671 provides engagement support around the post 631, specifically on opposing sides of the post 631.

As shown in FIG. 14, each post 631 includes a set of ridges 633 configured to integrate with the slot 671. The ridges 633 may also be said to be formed from a plurality of barrels, as discussed above. As seen in FIG. 15, the mating slot 671 includes a series of semi-cylindrical grooves 673. The grooves 673 extend along either side of the mating slot 671. The ridges 633 of the post 631 and semi-cylindrical grooves 673 maximize a contact surface area of the pin-rack engagement feature. In some examples, the post 631 and the grooves 673 are formed to define complimentary non-circular geometric profiles, In the illustrative embodiment, the slot 671 extends through and is bounded on all sides by the rack 672 as shown in FIG. 15. In some examples, the slot 671 does not extend through the entire rack 672. The slot 671 is generally positioned on an opposite side of the rack 672 from the respective locking bar engaging groove 604 of that rack.

As compared to the embodiment shown in FIGS. 12 and 13, the increased size of the post 631 increases a strength of the post, particularly in the vertical direction. This improves the overall strength of the lock cylinder, avoiding damage in response to objects being inserted into a keyway opening, such as keyway opening 244. To accommodate the increased size of the post 631 while maintaining a constant number of possible relative positions between the pin 638 and rack 672, a corresponding increase in a number of grooves 673 within the slot 671 are provided relative to the number of grooves 573 within the slot 571 seen in FIG. 13. Additionally, as with the above embodiments, although a single post 631 is shown as associated with the pin 638, the pin 638 may include two such posts, having complementary opposed posts extending from opposite sides of the pin. Each of the opposed posts 631 of a given pin 638 may be slightly offset from one another (e.g., by at least one groove position 673 within corresponding mating slots) to ensure that a single position of the key follower allows the locking bars to move to the unlocked position.

The features of one spring-loaded pin 238, 338, 438, 538, 638 or rack 272, 372, 472, 572, 672 can be used in any other spring-loaded pin 238, 338, 438, 538, 638 or rack 272, 372, 472, 572, 672. Spring-loaded pins 238, 338, 438, 538, 638 can include more or less posts 231, 331, 431, 531, 631 and racks 272, 372, 472, 572, 672 can include more or less grooves 273, 373, 473, 573, 673. Additionally, the posts can include more or fewer barrels than are seen in the various embodiments.

Examples

Illustrative examples of the lock cylinder disclosed herein are provided below. An embodiment of the lock cylinder may include any one or more, and any combination of, the examples described below.

Example 1 is a rekeyable lock cylinder with a cylinder body and a plug assembly disposed in the cylinder body. The cylinder body has a longitudinal axis and is formed to define grooves. The plug assembly is rotatable about the longitudinal axis. The plug assembly includes a plug body, a first carrier subassembly disposed along a first side of the plug body, and a second carrier subassembly disposed along an opposing second side of the plug body. Each of the first carrier subassembly and the second carrier subassembly includes a locking bar, a key follower disposed in the plug assembly, and a rack disposed in the plug assembly. The locking bars are movable between a locked position engaged with one of the grooves of the cylinder body for blocking rotation of the plug assembly with respect to the cylinder body and an unlocked position spaced apart from one of the grooves of the cylinder body to allow rotation of the plug assembly with respect to the cylinder body. The racks control movement of the locking bars between the locked and unlocked positions. The racks are selectively disengageable from the key followers to facilitate rekeying between different keys. The key followers are formed to define two posts. Each rack is formed to include a slot extending through and bounded by the rack. The post is received in the slot such that complementary engagement surfaces of the post and slot engage with one another to block movement of the key follower relative to the rack.

In Example 2, the subject matter of Example 1 is further configured such that each post is formed to define at least a semi-cylindrical outer surface. Each slot includes a series of semi-cylindrical grooves. The semi-cylindrical outer surface of the post engages with at least one of the semi-cylindrical grooves of the slot when the post is received in the slot.

In Example 3, the subject matter of Example 2 is further configured such that each post includes a barrel defining the at least semi-cylindrical surface and a rib.

In Example 4, the subject matter of Example 3 is further configured such that each slot further includes a recess for receiving the rib.

In Example 5, the subject matter of Example 2 is further configured such that each post includes two barrels defining the at least semi-cylindrical surface.

In Example 6, the subject matter of Example 5 is further configured such that the barrels are offset from one another in a linear pattern.

In Example 7, the subject matter of Example 2 is further configured such that each post includes three barrels defining the at least semi-cylindrical surface.

In Example 8, the subject matter of Example 7 is further configured such that the barrels are offset from one another in a triangular pattern.

In Example 9, the subject matter of Example 8 is further configured such that a first series of semi-cylindrical grooves is arranged along a first side of each slot and a second series of semi-cylindrical grooves is arranged along a second side of each slot. The first series of semi-cylindrical grooves is offset from the second series of semi-cylindrical grooves.

In Example 10, the subject matter of Example 1 is further configured such that a locking bar engaging groove of each rack is wider than a flange of each locking bar to allow a variation in position of each rack relative to each locking bar when each locking bar is in the unlocked position.

In Example 11, the subject matter of Example 10 is further configured such that the locking bar engaging groove of the rack of the first carrier subassembly is offset from the locking bar engaging groove of the rack of the second carrier subassembly such that a single position of the key follower allows the locking bars to move to the unlocked position.

In Example 12, the subject matter of Example 1 is further configured such that the lock cylinder allows at least ten different positions of each key follower relative to each rack to allow at least ten different bitting positions in the rekeyable lock cylinder.

In Example 13, the subject matter of Example 1 is further configured such that the two posts of the key follower are received into slots of corresponding first and second racks such that a locking bar engaging groove of the rack of the first carrier subassembly is offset from the locking bar engaging groove of the rack of the second carrier subassembly.

In Example 14, the subject matter of Example 1 is further configured such that each post includes a plurality of barrels.

In Example 15, a rekeyable lock cylinder includes a cylinder body with a longitudinal axis and formed to define grooves, and a plug assembly disposed in the cylinder body and being rotatable about the longitudinal axis relative to the cylinder body, the plug assembly including a plug body, a first carrier subassembly disposed along a first side of the plug body, and a second carrier subassembly disposed along an opposing second side of the plug body. The rekeyable lock cylinder further includes a key follower disposed in the plug assembly. Each of the first carrier subassembly and the second carrier subassembly includes a locking bar movable between a locked position engaged with one of the grooves of the cylinder body for blocking rotation of the plug assembly with respect to the cylinder body and an unlocked position spaced apart from one of the grooves of the cylinder body to allow rotation of the plug assembly with respect to the cylinder body, and a rack disposed in the plug assembly, wherein the rack controls movement of the locking bar between the locked and unlocked positions and the rack is selectively disengageable from the key follower to facilitate rekeying between different keys. The key follower is formed to define first and second posts, each rack is formed to include a slot extending through and bounded by the rack, and each of the first and second posts is received in a slot of a corresponding rack of the first carrier subassembly and the second carrier subassembly such that complementary engagement surfaces of the post and the slot engage with one another to block movement of the key follower relative to the rack.

In Example 16, the subject matter of Example 15 further includes a plurality of key followers.

In Example 17, the subject matter of Example 15 is further configured such that each of the first and second posts includes a plurality of barrels.

In Example 18, the subject matter of Example 17 is further configured such that the barrels of each of the first and second posts are offset from adjacent barrels in a linear pattern.

In Example 19, the subject matter of Example 15 is further configured such that the first and second posts of the key follower are received into slots of corresponding racks of the first and second carrier subassemblies such that a locking bar engaging groove of the rack of the first carrier subassembly is offset from the locking bar engaging groove of the rack of the second carrier subassembly.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rekeyable lock cylinder comprising:

a cylinder body defining a longitudinal axis, wherein an interior surface of the cylinder body defines at least a first longitudinal groove and a second longitudinal groove; and a plug assembly at least partially disposed in the cylinder body and selectively rotatable about the longitudinal axis, the plug assembly including a plug body, a key follower disposed at least partially within the plug body, a first carrier subassembly, and a second carrier subassembly, the first carrier subassembly and the second carrier subassembly disposed on opposite sides of the plug body, wherein each of the first carrier subassembly and the second carrier subassembly includes:

a locking bar corresponding to one of the first and second longitudinal grooves, wherein the locking bar is selectively engageable with the one of the first and second longitudinal grooves to block rotation of the plug assembly with respect to the cylinder body; and a rack that controls movement of the locking bar, wherein the key follower selectively engages both racks from the first carrier subassembly and the second carrier subassembly to allow the racks to follow movement of the key follower upon insertion of a key, and wherein when the key follower is disengaged from the racks, rekeying between different keys is facilitated.

2. The rekeyable lock cylinder of claim 1, wherein the key follower includes a pin body having a first pin-rack engagement feature and a second pin-rack engagement feature, the first pin-rack engagement feature is disposed on an opposite side of the pin body from the second pin-rack engagement feature.

3. The rekeyable lock cylinder of claim 2, wherein the first pin-rack engagement feature includes a first post and the second pin-rack engagement feature includes a second post, the first post being the same configuration as the second post.

4. The rekeyable lock cylinder of claim 3, wherein the pin body defines a height of the key follower, the first post and the second post positioned at different height locations on the pin body.

5. The rekeyable lock cylinder of claim 3, wherein the first and the second posts extend in a direction substantially parallel to the longitudinal axis.

6. The rekeyable lock cylinder of claim 1, wherein the racks of each of the first and second carrier subassemblies are oppositely biased.

7. The rekeyable lock cylinder of claim 1, wherein the first carrier subassembly includes a first rack and the second carrier subassembly includes a second rack, the first rack positioned symmetrically relative to the second rack about the plug body.

8. The rekeyable lock cylinder of claim 7, wherein the first rack is aligned with the second rack along the longitudinal axis.

9. The rekeyable lock cylinder of claim 7, wherein the first rack has a substantially similar configuration to the second rack.

10. The rekeyable lock cylinder of claim 1, wherein each of the first carrier subassembly and the second carrier subassembly further includes a carrier that supports the rack, the carrier selectively movable relative to the plug body to disengage the rack from the key follower.

11. The rekeyable lock cylinder of claim 10, wherein the first carrier subassembly includes a first carrier and the second carrier subassembly includes a second carrier, the first carrier independent from the second carrier.

12. The rekeyable lock cylinder of claim 1, wherein the first carrier subassembly includes a first locking bar and the second carrier subassembly includes a second locking bar, the first locking bar biasing in an opposite direction relative to the second locking bar.

13. A rekeyable lock cylinder comprising:

a cylinder body with a longitudinal axis and formed to define grooves;

a plug assembly disposed in the cylinder body and being rotatable about the longitudinal axis, the plug assembly including a plug body, a key follower disposed in the plug assembly, a first carrier subassembly disposed along a first side of the plug body, and a second carrier subassembly disposed along an opposing second side of the plug body, wherein each of the first carrier subassembly and the second carrier subassembly includes:

a locking bar movable between a locked position engaged with one of the grooves of the cylinder body for blocking rotation of the plug assembly with respect to the cylinder body and an unlocked position spaced apart from one of the grooves of the cylinder body to allow rotation of the plug assembly with respect to the cylinder body; and a rack disposed in the plug assembly, wherein the rack controls movement of the locking bar between the locked and unlocked positions and the rack is selectively disengageable from the key follower to facilitate rekeying between different keys.

14. The rekeyable lock cylinder of claim 13, wherein the key follower is formed to define a pair of posts, a first post engageable with a first rack of the first carrier subassembly and a second post engageable with a second rack of the second carrier subassembly to define a bitting position of the key follower.

15. The rekeyable lock cylinder of claim 13, wherein a locking bar engaging groove of each rack is wider than a flange of each locking bar.

16. The rekeyable lock cylinder of claim 13, wherein the first side of the plug body is a first planar surface configured to receive the first carrier subassembly and the second side of the plug body is a second planar surface configured to receive the second carrier subassembly, and wherein the plug body includes a channel for receiving the key follower, the channel open to both the first and the second planar surfaces.

17. The rekeyable lock cylinder of claim 16, wherein the first planar surface includes a first rack-engaging feature and the second planar surface includes a second rack-engaging feature, the first rack-engaging feature positioned at a different height on the plug body than the second rack-engaging feature.

18. A rekeyable lock cylinder comprising:

a cylinder body defining a longitudinal axis, wherein an interior surface of the cylinder body defines at least a first longitudinal groove and a second longitudinal groove; and a plug assembly at least partially disposed in the cylinder body and selectively rotatable about the longitudinal axis, the plug assembly including:

a plug body;

a key follower disposed at least partially within the plug body;

a first carrier subassembly including:

a first locking bar corresponding to the first longitudinal groove; and a first rack that controls movement of the first locking bar; and a second carrier subassembly including:

a second locking bar corresponding to the second longitudinal groove; and a second rack that controls movement of the second locking bar;

wherein the first and second locking bars are selectively engageable with the first and second longitudinal grooves, respectively, to block rotation of the plug assembly with respect to the cylinder body, wherein the first and the second racks control movement of the first and second locking bars, respectively, and wherein the key follower selectively engages both the first and second racks simultaneously to allow the first and second racks to follow movement of the key follower upon insertion of a key.

19. The rekeyable lock cylinder of claim 18, wherein the key follower includes a first post and a second post, the first rack defining a first slot, the second rack defining a second slot, and wherein the first and second posts are at least partially received in the corresponding first and second slots to block movement of the key follower relative to the first and second racks.

20. The rekeyable lock cylinder of claim 19, wherein the first and second posts of the key follower are received into the corresponding first and second slots such that a first locking bar engaging groove of the first rack is offset from a second locking bar engaging groove of the second rack.

* * * * *